Aug. 17, 1965   L. MORIN   3,201,750
AUTOMOBILE SWERVE ALARM SYSTEM
Filed Jan. 2, 1962   2 Sheets-Sheet 1
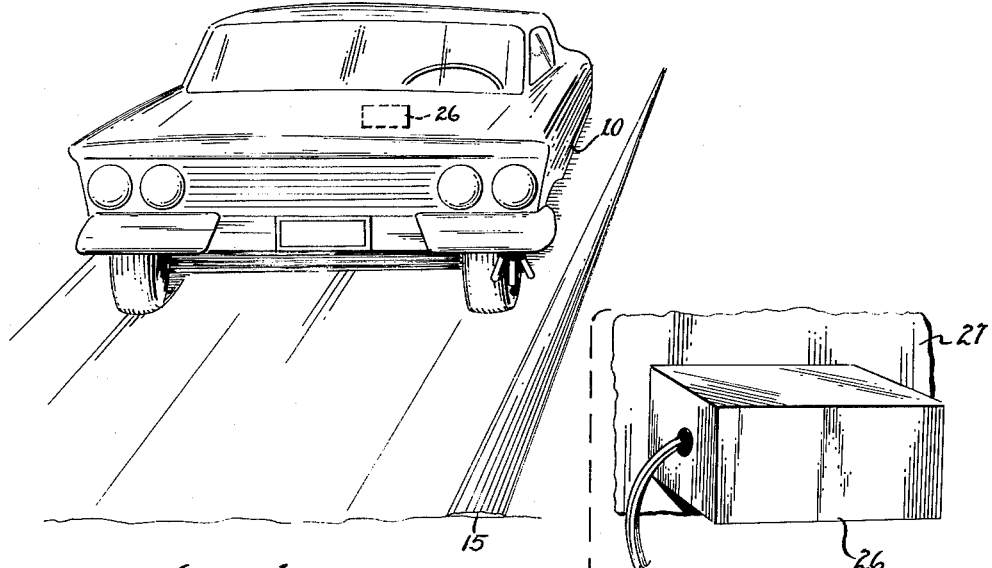
fig. 1
fig. 2
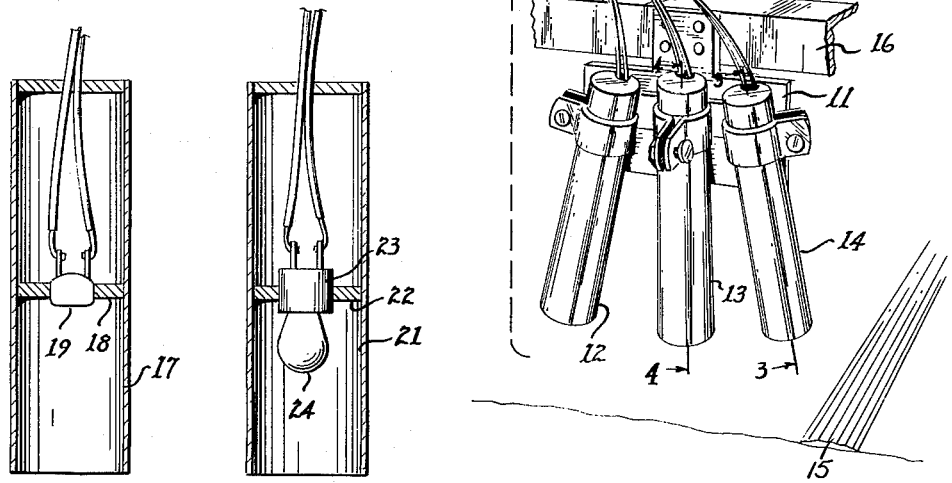
fig. 3   fig. 4
INVENTOR.
LAWRENCE MORIN
BY
John J. McLaughlin INVENTOR.
LAWRENCE MORIN
BY
John J. McLaughlin United States Patent Office 3,201,750
Patented Aug. 17, 1965

3,201,750
AUTOMOBILE SWERVE ALARM SYSTEM
Lawrence Morin, P.O. Box 1284, Sierra Vista, Ariz.
Filed Jan. 2, 1962, Ser. No. 163,651
2 Claims. (Cl. 340—52)

My invention relates to automobile danger alarm systems and more in particular to such a system which has for its purpose signalling the operator when he comes dangerously close to the lefthand side of the road or lane in which he is travelling.

One of the sources of automobile traffic accidents which it has been difficult to control is that caused by a driver suddenly swerving to the left of a road or pavement into the path of an on-coming vehicle. It is known that frequently such accidents are caused by the driver of the swerving vehicle becoming inattentive, looking around away from his direction of travel, falling asleep or in some other way losing complete control of his vehicle. Systems intended for remedying this situation have been suggested including, for example, applying a line of radio-active, magnetic or the like material to the road in place of the usual white marker line, and equipping vehicles with a device having the capacity of picking up the radiation from the center line and either signalling the driver or actually steering the automobile away from the center of the road. This suggestion has many disadvantages, principally one of expense, and the need to co-ordinate the equipping of all roads and all vehicles with co-operating mechanism or means for accomplishing the intended results.

Another and simpler suggestion has been merely to direct a light-sensitive cell in the direction of the white dividing line and signalling to the operator when he comes dangerously close to this dividing line. While this system has many advantages, particularly from the standpoint of simplicity and the fact that individual automobiles may be so equipped and operated in response to marking lines already in place, it has the disadvantage that it is inaccurate, either insensitive or too sensitive, or will be triggered by radiations of all kinds such as from passing cars, or radiation from light pavement and the like.

The principal object of my present invention is the provision of a fool-proof relatively inexpensive and highly accurate alarm system to warn automobile drivers when they are approaching the center line of the pavement.

Another object is the provision of a system which can operate in response to marking and dividing lines already in existence, whether they be single lines, double lines, broken lines or colored lines.

Still another object is the provision of an alarm system which can be made extremely sensitive but which will not be triggered by passing automobiles, or by reflection from relatively light-colored pavement.

Other specific objects and features of the invention will be apparent from the following detailed description taken with the accompanying drawings, wherein:

FIG. 1 is a perspective view showing an automobile equipped with the system of the present invention and illustrating a typical position on the roadway when the alarm would be sounded;

FIG. 2 is a slightly enlarged composite view, as contrasted with FIG. 1, showing the manner in which the parts of the present invention may be attached and the general relationship of the parts;

Figure 5:
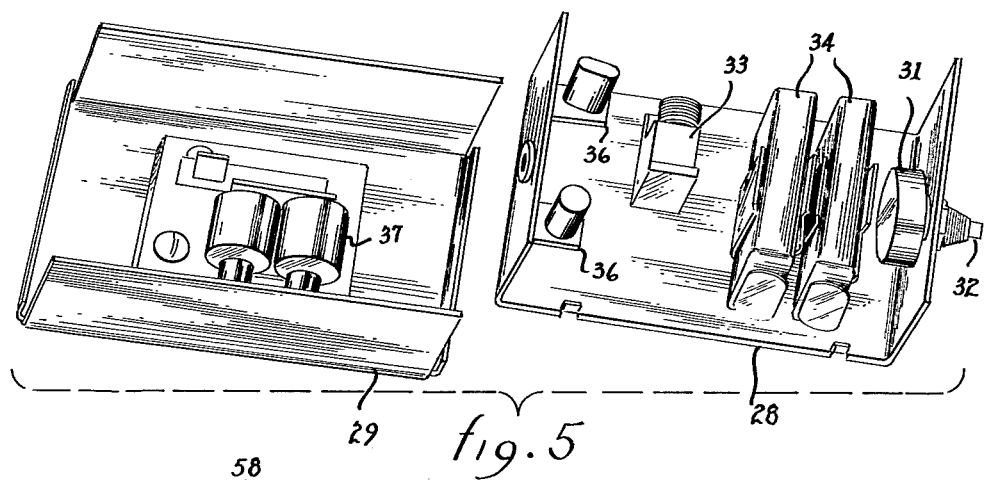
Figure 6:
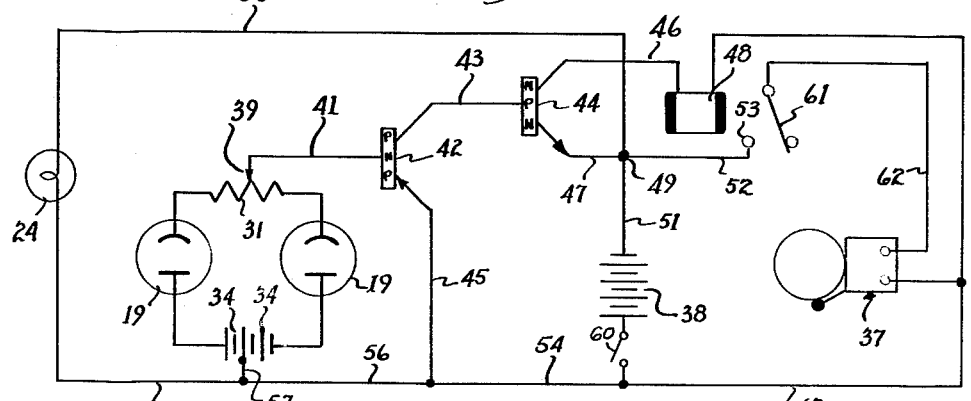
Figure 7:
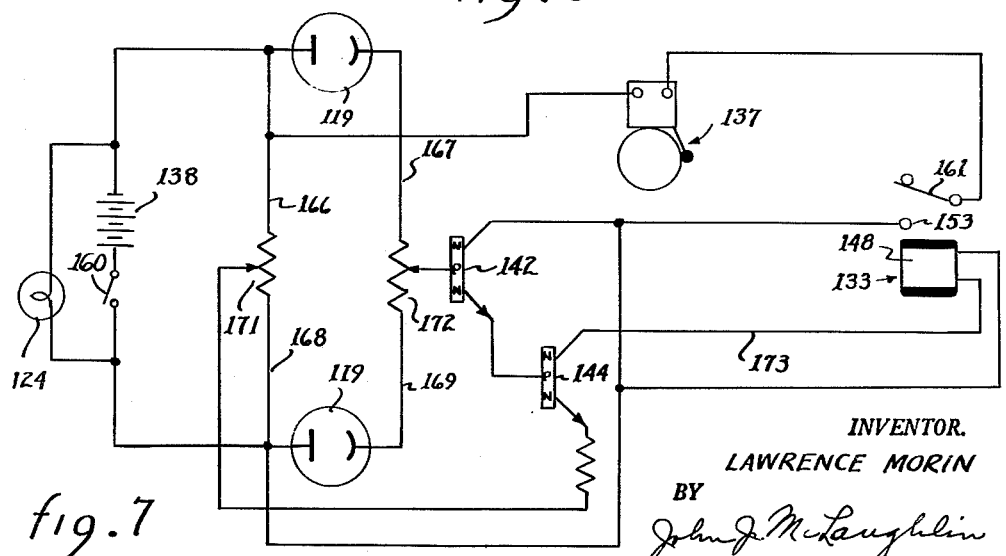

FIGS. 3 and 4 are slightly enlarged longitudinal sectional views taken on the lines 3—3 and 4—4 of FIG. 2;

FIG. 5 shows the housing with the cover removed and showing the signalling or alarm device attached to the cover, and FIGS. 6 and 7 are representative circuits which may be employed in the practice of the present invention.

In accordance with the features of the present invention I utilize a light-sensitive cell and mount it in such a position that it will not receive stray illumination from passing vehicles and the like. The signal from this cell is led into an amplifying circuit which, in turn, actuates an alarm circuit when the cell is receiving radiations from a light-colored dividing line in the pavement. While I say "light-colored dividing line" because the dividing lines are normally lighter in color than the pavement on which they are painted, it will be noted as the description progresses that even though the dividing were dark and the pavement light the system could be made to operate in the same fashion.

Coupled with the system already described are the signal means preventing operation of the alarm circuit when the cell receives light from light-colored pavement, which normally could be confused with the light-colored dividing line separating the two sides of the pavement.

In actual practice I utilize two light-sensitive cells and connect them into a bridge circuit which is arranged so that it can be balanced with whatever value of resistance in the two cells may have been predetermined as desirable. The bridge circuit is connected into a larger circuit which includes a source of power, and an amplifying circuit which receives current resulting when the bridge circuit is imbalanced by light differential condition, and this amplifying circuit in turn controls a relay which in turn actuates the signal circuit.

Referring now more specifically to the drawings, an automobile 10 carries a bracket 11 on which three tubular support members 12, 13 and 14 are mounted. The bracket 11 is illustrative and also the manner in which the mounting members 12, 13 and 14 are secured in position. In the drawing I have shown the bracket 11 riveted to a piece of frame 16. This, of course, is also illustrative, the only necessity being that the support members 12, 13 and 14 be mounted in a specific relationship to each other and to the road to secure the necessary functions, as will be described.

The members 12 and 14 are identical. They include a tube indicated generally by the reference character 17 with a divider 18 in which a light-sensitive cell 19 is supported. The light-sensitive cell 19 may be of any suitable type. They are preferably cells which do not themselves generate appreciable E.M.F. but merely vary in resistance, depending upon the amount of light shining on them. Common types of selenium cells may be used for the purpose. In actual practice I have employed a light-sensitive cell sold by Polaris Electronics Corporation under the title "Light Dependent Resistor" and the catalog number of said cell is LDR–C1. As noted, however, almost any suitable light-sensitive cell may be used for the purpose, it being necessary only that it be balanced in the circuit to function in accordance with its intended manner.

The member 13 also has a tube 21 which may be identical with the tube 17, and it has a divider 22 supporting a lamp base 23. A suitable lamp 24 is carried in the base 23. While the lamp 24 may be of various types, I have found for my purpose and utilizing the balance of the equipment as disclosed in the embodiment shown in the drawings, a light source totalling forty-five watts is adequate.

The members 12 and 14 which are identical in construction are supported at a slight angle to each other, such as an angle of ten degrees or thereabouts, the member 14 pointing forwardly and slightly toward the left of the vehicle so that it is in a position to pick up light reflected from the dividing marker or line 15 before the wheels of the automobile actually come into contact with the line. The actual positioning is a matter of judgment, but I have found that to prevent repetitious sounding of the alarm the automobile should be permitted to approach within six inches or thereabouts of the center marker without actually sounding an alarm. The member 13 is placed between the members 12 and 14 and points substantially directly downwardly and, if desired, slightly forwardly so that light directed onto the pavement by the member 13 will be reflected back to the member 12 and 14 in about equal intensity.

A small "black box" 26 which contains the amplifying and signal apparatus is mounted on a panel 27 within the automobile, such, for example, as the fire wall or the rear of the instrument panel. Located in this position, its parts which tend to be sensitive to temperature change are protected and substantially uniform temperature conditions are maintained during operation. As shown in the drawings, and particularly in FIG. 5, there is a housing 28 and a removable cover 29. A potentiometer 31 is mounted on one end of the housing 18 and has an adjustment screw 32 exterior of the housing by means of which the potentiometer may be adjusted in accordance with requirements pointed out hereinbelow. The housing also includes a relay 33 and in the form shown a pair of small 9-volt batteries 34. As will be seen from one of the circuits, however, I may use the regular automobile battery power for the entire circuit.

The relay 33 closes a circuit which energizes a buzzer indicated generally by the reference character 37 and mounted on top of the housing cover 29. Mechanically, the equipment described comprises the entire device and from a mounting and service standpoint it comprises only a bracket carrying the three members 12, 13 and 14 and the black box 26.

Several different types of circuits may be used successfully to accomplish the objects of the invention and in the drawings I show two circuits, FIG. 6 of which utilizes a pair of batteries 34 as a separate source of power, the power for the signalling circuit and amplifying circuit being furnished by the car battery indicated generally by the reference character 38.

Looking now more particularly at FIG. 6, the light-sensitive tubes 19 are connected into a bridge circuit including the potentiometer 31 and the two batteries 34. A take-off sliding contact 39 is adjustable to distribute the windings of the potentiometer between the two legs of the bridge circuit. The sliding contact 39 is connected by a conductor 41 to the base of a transistor 42, the opposite leads of which are connected to conductors 43 and 44. In this particular circuit the transistor 42 may, for example, be the type known as 2N270. The conductor 43 runs to a transistor 44, which may be a 2N213 type, and this in turn has its two opposite leads connected to conductors 46 and 47. Conductor 46 leads to one side of a relay coil 48, while conductor 47 goes to a contact 49. Contact 49 is connected by a conductor 51 to one side of the battery 38 and by a conductor 52 to a terminal 53. The circuit through the bridge is completed from battery 38 through conductors 54, 56 and 57 back to opposite sides of the batteries 34.

To provide illumination to the cells 19, lamp 24 is connected to one side of the battery 38 by a conductor 58 and to the opposite side by a conductor 59. A circuit is established, such that the lamp 24 is lit during the entire time the device is in operation. A suitable central switch 60 may be provided if desired to energize or de-energize the entire circuit.

Relay armature 61 which is normally un-actuated is in the position shown in FIG. 6 when the relay coil 48 is not energized. When the armature 61 is drawn to its relay, however, it engages the contact 53 and establishes a circuit including the coil of the signal device 37, a conductor 62 and a conductor 63.

In the modification shown in FIG. 7 many of the parts are identical, including the cells 19 and the car battery 38. In FIG. 7 I utilize the same numbers to identify like parts but with the numeral "1" applied as a prefix to indicate modification.

In the FIG. 7 circuit the bridge contains two legs defined by conductors 166 and 167 in the case of one leg, and 168 and 169 in the case of the other leg. Each leg includes part of a divided potentiometer 171 and a second divided potentiometer 172. Each leg also contains one of the cells 119. In FIG. 7 both potentiometers carry sliding contacts for adjustment. The potentiometer 171 first balances the legs of the circuit, and the potentiometer 172 establishes the sensitivity of the previously established circut, so that the variation between light and dark which will trigger the alarm circuit can be established.

In the circuit of FIG. 7 the transistor 142 and the transistor 144 will be of the 2N35 type. In this connection it may be noted that in FIG. 6 the first transistor is a PNP type and the second an NPN type, while in the case of FIG. 7 both transistors are of the NPN type. It is necessary that the polarities of the transistors be controlled for proper results in both cases, and the circuits show proper polarity for actual operation. Variations of all kinds in this circuit may, of course, be made by those who understand electronic circuitry. While I show a transistorized circuit, it is, of course, obvious that any type of amplifying device may be used.

The output of the transistor 144 is to the relay coil 148 through conductor 173 and, as in the case of FIG. 6, closure of the armature 161 will energize the signalling device 137, which will then sound a signal and warn the driver. The lamp 124, as in the previously discussed circuit, is connected to opposite sides of the battery 138.

The operation of the system of the present invention should be clear from the previous description. With the equipment mounted on the automobile the circuit is adjusted so that the relay coil 148 will be energized when cell 19 is receiving more reflected light than the other. Adjustment can be made to make the device as sensitive as desired without continuous tripping, such as will occur if it is made too sensitive. The circuit of FIG. 7 is preferred because it provides two adjustments; one for the two legs of the Wheatstone type bridge, and the other for the sensitivity of the circuit including the particular cell which is directed toward the white line.

I have described my invention in detail so that those skilled in the art will understand the manner of practising the same, but the scope of the invention is defined by the claims.

1. In an automobile danger alarm system:
 (a) a pair of generally tubular support members on an automobile so that one such tubular support is pointed in a general direction forwardly toward the pavement and to the left of the automobile, and the other tubular support at an angle thereto but toward a center portion of the pavement,
 (b) a light-sensitive cell supported in each such tube in a position not to receive direct light from passing vehicles,
 (c) an alarm device,
 (d) circuit means for actuating said alarm device when the light reflected from the pavement to said cells has a predetermined differential value,
 (e) a light source,
 (f) means for supporting the light source on the vehicle to reflect light from said source to and from the pavement in substantially equal intensity to each light-sensitive cell,
 (g) a Wheatstone type bridge with two legs, each of which includes one of said cells, (h) adjustable potentiometer means for balancing said bridge circuit with a predetermined resistance value for each cell,
(i) an amplifying circuit including a power source, said bridge circuit and a relay coil, so that imbalance of said bridge circuit will cause a current to flow, and said current to be amplified to energize said relay coil,
(j) signal means responsive to energization of said relay coil and actuation of the relay armature to signal to the automobile driver when one of said cells is receiving radiations from a road dividing marker.

2. A system as defined in claim 1, including
(a) means in addition to said adjustable potentiometer for controlling the sensitivity of the amplified current to thus establish the differential character of a road surface necessary to actuate the signal means.

References Cited by the Examiner
UNITED STATES PATENTS

| | | | |
|---|---|---|---|
| 1,981,206 | 11/34 | Strauss | 88—79 |
| 2,209,158 | 1/40 | Goldsmith | 340—53 |
| 2,493,755 | 1/50 | Ferrill | 340—52 |
| 2,520,680 | 8/50 | Hamilton | 340—282 |
| 2,745,089 | 5/56 | Levy | 340—236 |
| 2,750,583 | 6/56 | McCullough | 340—282 |
| 3,051,934 | 8/62 | Lesher | 340—224 |

NEIL C. READ, *Primary Examiner.*
ROBERT H. ROSE, *Examiner.*